(12) United States Patent
Tang (10) Patent No.: US 9,077,187 B2
(45) Date of Patent: Jul. 7, 2015

(54) APPARATUS AND METHOD FOR CONTROLLING CHARGING AND DISCHARGING OF BATTERIES

(75) Inventor: Jun Tang, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 531 days.

(21) Appl. No.: 13/482,397

(22) Filed: May 29, 2012

(65) Prior Publication Data

US 2013/0076519 A1    Mar. 28, 2013

(30) Foreign Application Priority Data

Sep. 27, 2011    (CN) .......................... 2011 1 0296810

(51) Int. Cl.
| | |
|---|---|
| *G08B 21/00* | (2006.01) |
| *H02J 7/00* | (2006.01) |
| *H02J 7/34* | (2006.01) |
| *H02J 7/36* | (2006.01) |

(52) U.S. Cl.
CPC ............ *H02J 7/0019* (2013.01); *H02J 7/0022* (2013.01); *H02J 7/34* (2013.01); *H02J 7/36* (2013.01); *Y02T 10/7055* (2013.01)

(58) Field of Classification Search
None
See application file for complete search history.

(56) References Cited

U.S. PATENT DOCUMENTS

| | | | |
|---|---|---|---|
| 5,418,444 A * | 5/1995 | Cook et al. ................... | 320/125 |
| 2008/0143292 A1* | 6/2008 | Ward ............................ | 320/101 |
| 2011/0234150 A1* | 9/2011 | Furukawa et al. ............ | 320/101 |
| 2012/0013304 A1* | 1/2012 | Murase et al. ................ | 320/116 |
| 2012/0065828 A1* | 3/2012 | Kato .............................. | 701/22 |
| 2012/0299597 A1* | 11/2012 | Shigemizu .................... | 324/428 |
| 2012/0303397 A1* | 11/2012 | Prosser ........................ | 705/7.12 |
| 2012/0323421 A1* | 12/2012 | Avery ........................... | 701/22 |
| 2013/0009605 A1* | 1/2013 | Hongo et al. ................. | 320/134 |

\* cited by examiner

*Primary Examiner* — Curtis King
(74) *Attorney, Agent, or Firm* — Novak Druce Connolly Bove + Quigg LLP (57) ABSTRACT

An apparatus is electrically connected to a battery unit consisting of multiple batteries, an energy conversion system, and power-driven equipment. The apparatus sets number requirements of batteries to be connected to a discharge unit and a charge unit of the battery unit. When the power-driven equipment is started, the apparatus receives an open-circuit voltage of each battery detected by a sensor connected to the battery, and establishes connections of the batteries with the discharge unit or the charge unit according to the open-circuit voltages of the batteries and the number requirements. During the discharge unit supplying power to the power-driven equipment and the energy conversion system charging the charge unit, the apparatus monitors variations of the open-circuit voltages of the batteries, and switches the connections of batteries with the discharge unit or the charge unit according to associations between open-circuit voltages, cut-off discharge voltages, and nominal voltages of the batteries.

20 Claims, 6 Drawing Sheets

APPARATUS AND METHOD FOR CONTROLLING CHARGING AND DISCHARGING OF BATTERIES

BACKGROUND

1. Technical Field

The embodiments of the present disclosure relate to automatic control systems and methods, and more particularly to an apparatus and a method for controlling charge and discharge of batteries.

2. Description of Related Art

Often a battery unit consisting of multiple batteries is applied in an electric automobile. Due to differences in physical characteristics, different batteries may have different nominal voltages. In the factory, variations in the different nominal voltages may be very small. However, in use, the variations may increase over time, and because all the batteries in the unit are charged to the same nominal voltage, some batteries may be regularly overcharged affecting battery performance and shortening the useful life of the batteries.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or software, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
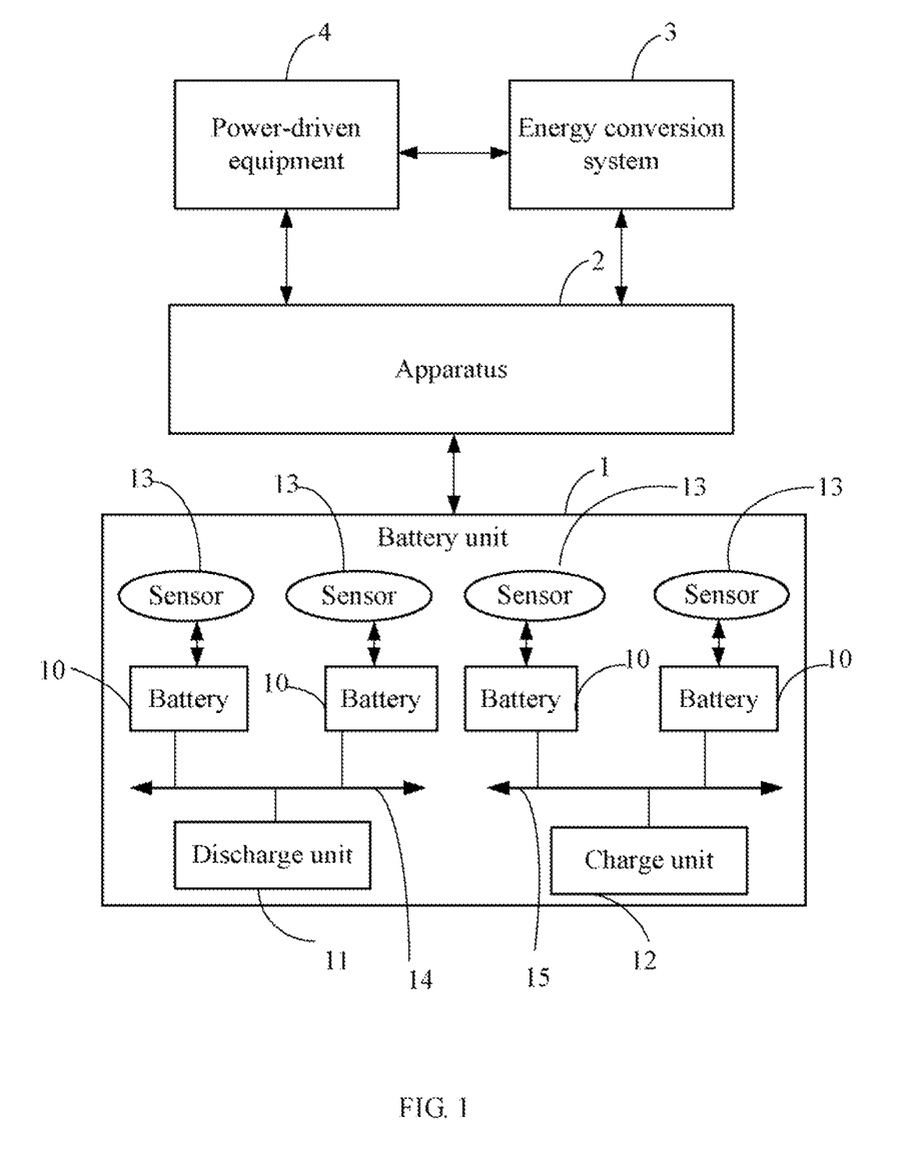
FIG. 1 is a block diagram of one embodiment of an application environment of an apparatus for controlling charging and discharging of batteries in a battery unit.

FIG. 1 is a block diagram of one embodiment of an application environment of an apparatus 2 for controlling charging and discharging of batteries 10 in a battery unit 1. In this embodiment, the apparatus 2 is electrically connected to the battery unit 1, an energy conversion system 3, and power-driven equipment 4. The energy conversion system 3 may include solar power generation apparatuses, wind power generation apparatuses, and electronic chargers. The power-driven equipment 4 may include one or more engines in an electric automobile, in-car entertainment, and an in-car navigation system, for example.

Figure 2:
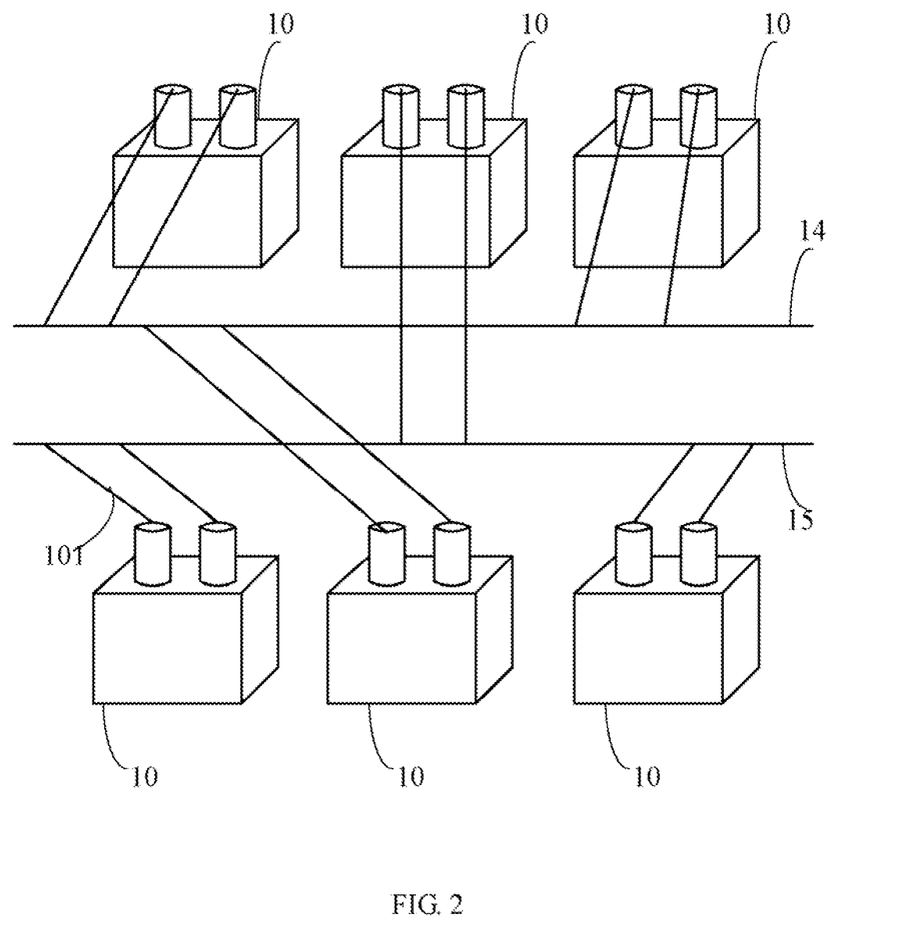
FIG. 2 is one example illustrating grouping the batteries in a charge unit and a discharge unit of the battery unit.

The battery unit 1 includes a discharge unit 11 and a charge unit 12, which are connectable to at least some of a plurality of batteries 10. As shown in FIG. 1 and FIG. 2, some of the batteries 10 are connected to the discharge unit 11 through a discharge cascade bus 14, and some of the batteries 10 are connected to the charge unit 12 through a charge cascade bus 15. The energy conversion system 3 charges batteries 10 connected to the charge unit 12. The batteries 10 connected to the discharge unit 11 provides power to the power-driven equipment 4. Each battery 10 is connected to a sensor 13, which detects voltage data of the battery 10, and sends the voltage data to the apparatus 2. The apparatus 2 exchanges connections of the batteries 10 with the discharge unit 11 and the charge unit 12 based on variations in the voltage data.

Figure 3:
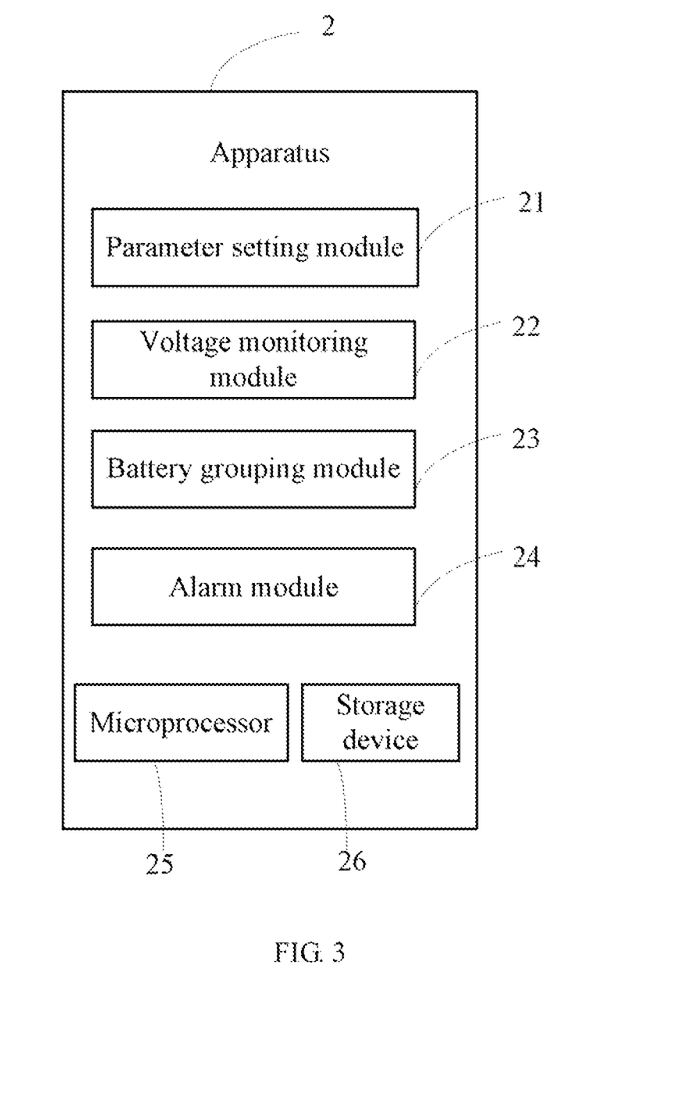
FIG. 3 is a block diagram of one embodiment of functions modules of the apparatus in FIG. 1.

As shown in FIG. 3, the apparatus 2 includes a plurality of functions modules, such as a parameter setting module 21, a voltage monitoring module 22, a battery grouping module 23, and an alarm module 24. The apparatus 2 further includes a microprocessor 25 and a storage device 26. The modules 21-24 may comprise computerized code in the form of one or more programs that are stored in the storage device 26. The computerized code includes instructions that are executed by the microprocessor 25, to provide the aforementioned functions of the apparatus 2. A detailed description of the functions of the modules 21-24 is given below with reference to FIG. 4 and FIG. 5. The storage device 26 may be a cache or a dedicated memory, such as an EPROM, a hard disk driver (HDD), or flash memory.

Figure 4:
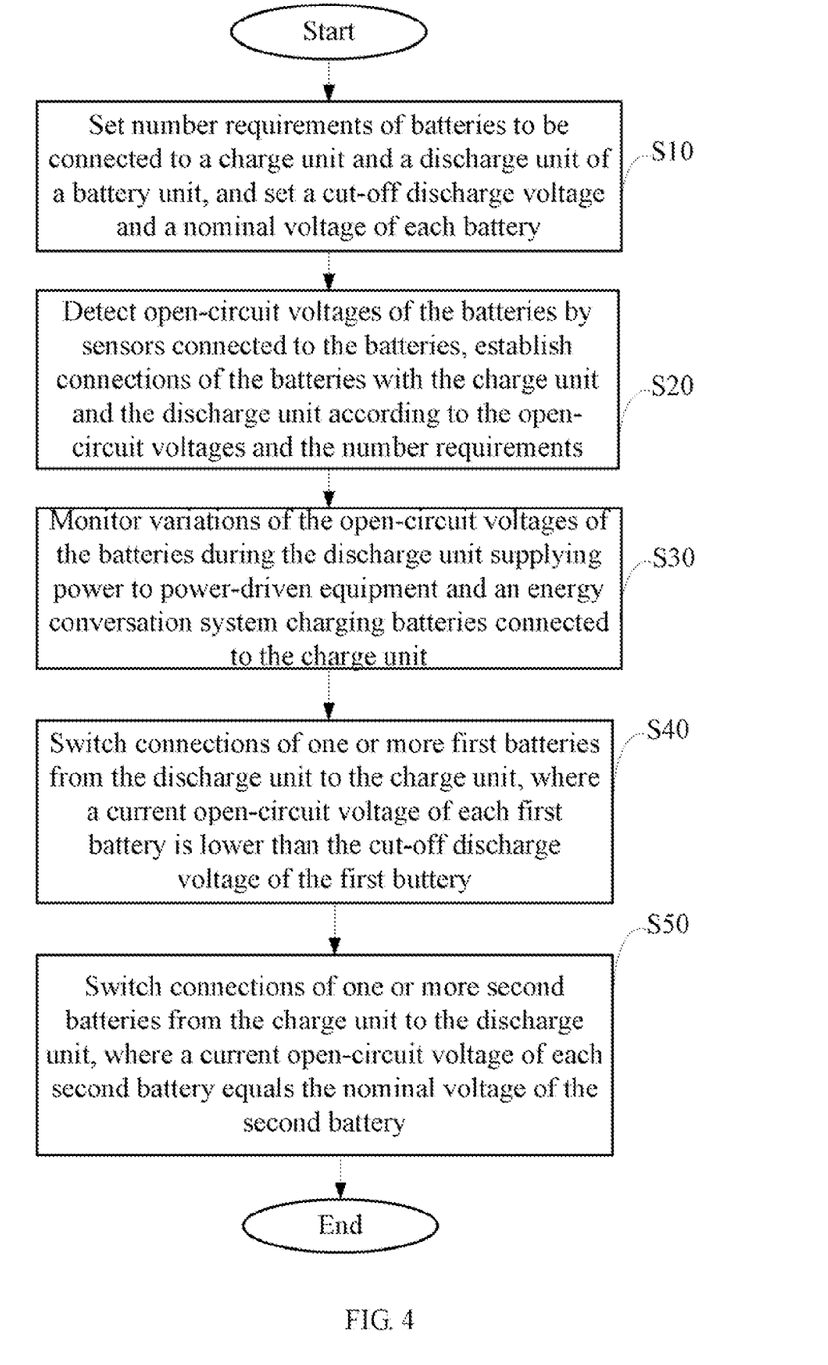
FIG. 4 is a flowchart of one embodiment of a method for controlling charging and discharging of batteries in a battery unit.

FIG. 4 is a flowchart of one embodiment of a method for controlling charge and discharge of the batteries 10 in the battery unit 1. Depending on the embodiment, additional steps may be added, others removed, and the ordering of the steps may be changed.

In step S10, the parameter setting module 10 sets number requirements of the batteries 10 to be connected to the discharge unit 11 and the charge unit 12 of the battery unit 1, and sets a cut-off discharge voltage and a nominal voltage of each battery 10. For example, a first number N1 of the batteries 10 to be connected to the discharge unit 11 may be set as a first proportion (such as 50%) of a total number N of the batteries 10 in the battery unit 1, or be set as more than the first proportion but less than a second proportion (such as 90%) of the total number N. A second number N2 of the batteries 10 to be connected to the charge unit 12 may be equal to (N−N1). A cut-off discharge voltage of a battery 10 is a voltage at which the battery 10 is considered fully discharged, and to stop discharge otherwise the battery 10 may be damaged. A nominal voltage of the battery 10 is a typical voltage when the battery 10 works with a usual temperature.

In step S20, when the power-driven equipment is started, each sensor 13 connected to a battery 10 detects an open-circuit voltage of the battery 10. The open-circuit voltage of the battery 10 is a difference of electrical potential between a positive terminal and a negative terminal of the battery 10. The voltage monitoring module 22 receives the open-circuit voltages of all of the batteries 10 sent by the sensors 13. The battery grouping module 23 establishes connections between the batteries 10 and the discharge unit 11 and the charge unit 12 according to the open-circuit voltages of the batteries 10 and the number requirements. For example, the battery grouping module 23 selects the N1 batteries 10 that have higher open-circuit voltages, sends signals to some control circuits to enable connections between the selected batteries 10 and the discharge unit 11, and enable connections between the remaining batteries 10 and the charge unit 12.

In step S30, the voltage monitoring module 22 monitors variations of the open-circuit voltages of the batteries 10 during the discharge unit 11 supplying power to the power-driven equipment 4 and the energy conversion system 3 charging the charge unit 12.

In step S40, the battery grouping module 23 switches connections of one or more first batteries 10 from the discharge unit 11 to the charge unit 12, to avoid over discharge of the first one or more batteries 10, where a current open-circuit voltage of each first battery 10 is lower than the cut-off discharge voltage of the first buttery 10. A detailed description of step S40 is given in FIG. 5 and below.

In step S50, the battery grouping module 23 switches connections of one or more second batteries 10 from the charge unit 12 to the discharge unit 11, to avoid over charge of the second one or more batteries 10, wherein a current open-circuit voltage of each second battery 10 equals the nominal voltage of the second battery 10. A detailed description of step S50 is given in FIG. 6 and below.

Figure 5:
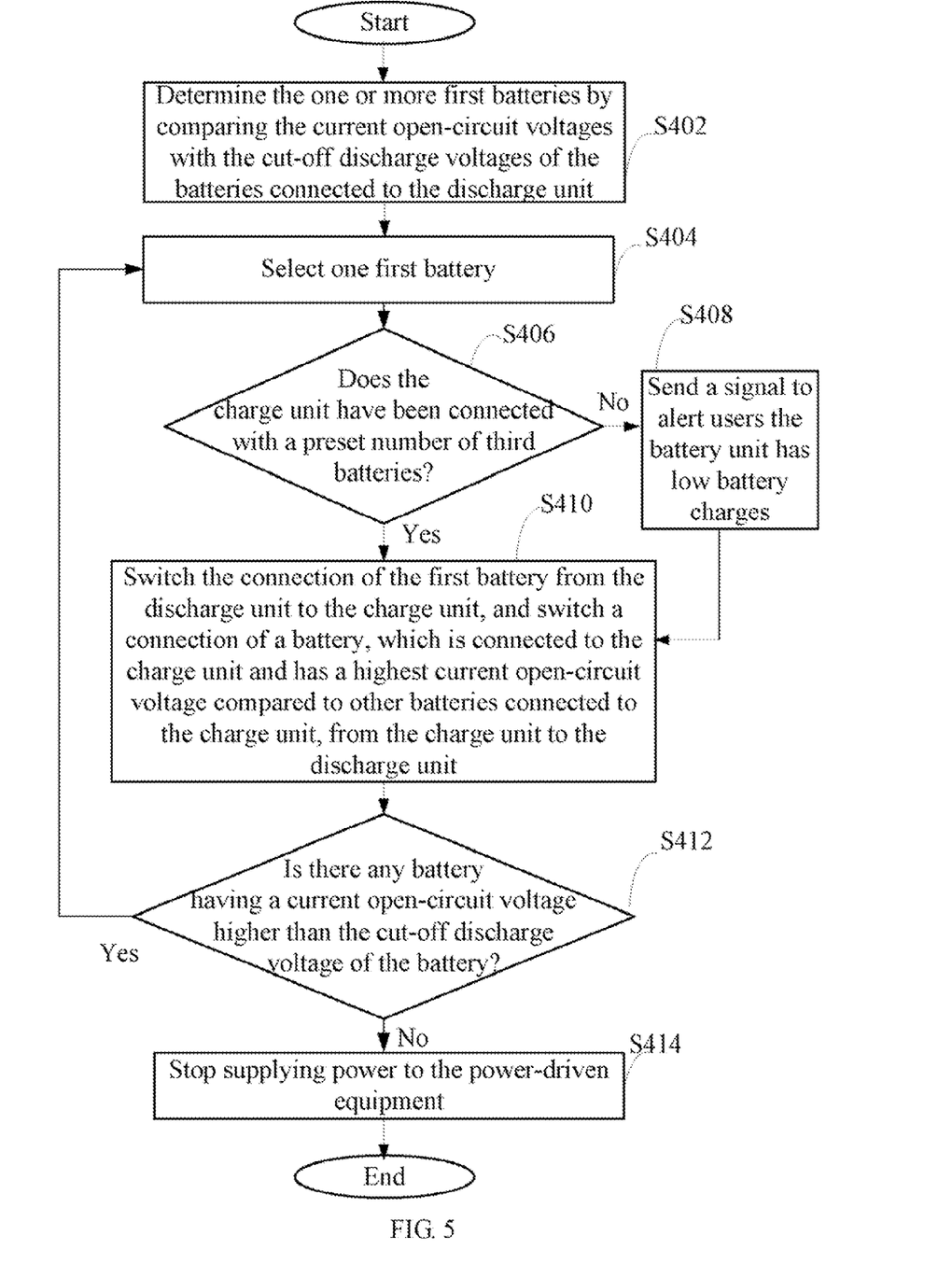
FIG. 5 is a detailed description of one step in FIG. 4.

FIG. 5 is a flowchart detailing step S40 of FIG. 4. Depending on the embodiment, additional steps may be added, others removed, and the ordering of the steps may be changed.

In step S402, the voltage monitoring module 22 determines the one or more first batteries 10 by comparing the current open-circuit voltages with the cut-off discharge voltages of the batteries 10 connected to the discharge unit 11. For example, if the cut-off discharge voltage of a battery 10 connected to the discharge unit 11 is 12V, but the current open-circuit voltage of the battery 10 is 10V, then the battery 10 is determined as a first battery 10, which needs to be connect to the charge unit 12.

In step S404, the voltage monitoring module 22 selects one first battery 10, such as the battery 10 has the current open-circuit voltage 10V.

In step S406, the voltage monitoring module 22 checks if the charge unit 12 has been connected with a preset number of third batteries 10, where each third battery 10 has a current open-circuit voltage that equals or is more than a cut-off discharge voltage of the third battery 10. For example, in this embodiment, the preset number may be set as a third proportion (such as 10%) of a total number N of the batteries 10 in the battery unit 1. If the charge unit 12 has been connected with the preset number of third batteries 10, the procedure directly goes to step S410. If the charge unit 12 has not been connected with the preset number of third batteries 10, in step S408, the alarm module 24 sends a signal to alert users that the battery unit 1 has low battery charges. The signal may be an audio signal output by a speaker, or a message displayed on a display device (not shown) of the apparatus 2. Then, the procedure goes to step S410.

In step S410, the battery grouping module 23 switches the connection of the first battery 10 from the discharge unit 11 to the charge unit 12, and switches a connection of a battery 10, which is connected to the charge unit 12 and has a highest current open-circuit voltage compared to other batteries 10 connected to the charge unit 12, from the charge unit 12 to the discharge unit 11. For example, the first battery 10 has the current open-circuit voltage 11.9V may be switched to connect to the charge unit 12, and a battery 10 connected to the charge unit 12 that has the highest current open-circuit voltage 36V may be switched to connect to the discharge unit 11.

In step S412, the voltage monitoring module 22 determines if there is any battery in the battery unit 1 that has a present open-circuit voltage higher than the cut-off discharge voltage of the battery 10. If there is a battery in the battery unit 1 that has a current open-circuit voltage higher than the cut-off discharge voltage of the battery 10, the discharge unit 11 continuously providing power to the power-driven equipment, and the procedure returns to step S404. Otherwise, if the current open-circuit voltage of each battery 10 in the battery unit 1 equals or is less than the cut-off discharge voltage of the battery 10, in step S414, the alarm module 24 informs the discharge unit 12 to stop supplying power to the power-driven equipment 4.

Figure 6:
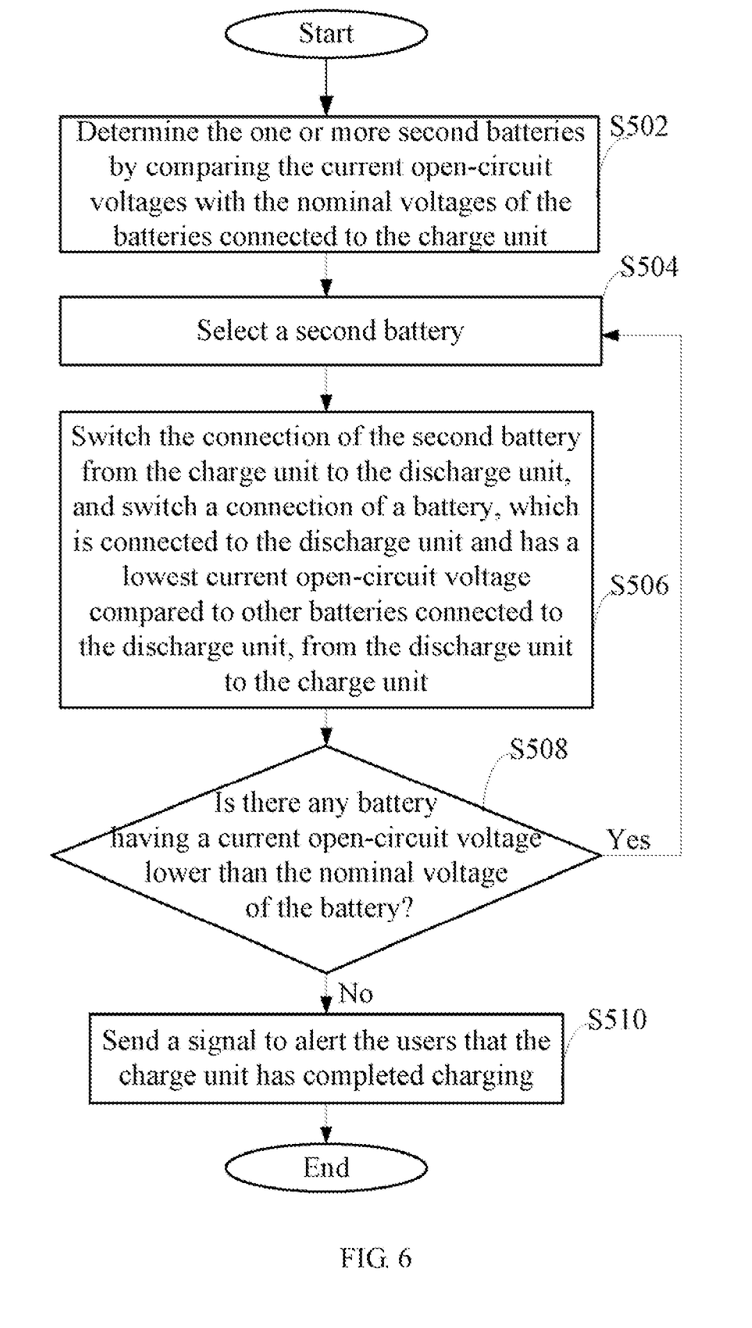
FIG. 6 is a detailed description of another step in FIG. 4.

FIG. 6 is a flowchart detailing step S50 in FIG. 4. Depending on the embodiment, additional steps may be added, others removed, and the ordering of the steps may be changed.

In step S502, the voltage monitoring module 22 determines the one or more second batteries 10 connected to the charge unit 12 by comparing the current open-circuit voltages with the nominal voltages of the batteries 10 connected to the charge unit 12. For example, if the nominal voltage and the current open-circuit voltage of a battery 10 connected to the charge unit 12 are both 24V, the battery 10 is determined as a second battery 10 to be connected to the discharge unit 11.

In step S504, the voltage monitoring module 22 selects one second battery 10, such as the battery 10 has the current open-circuit voltage 24V.

In step S506, the battery grouping module 23 switches the connection of the second battery 10 from the charge unit 12 to the discharge unit 11, and switches a connection of a battery 10, which is connected to the discharge unit 11 and has a lowest current open-circuit voltage compared to other batteries 10 connected to the discharge unit 11, from the discharge unit 11 to the charge unit 12. For example, the second battery 10 has the current open-circuit voltage 24V may be connected to the discharge unit 11, and the battery 10 that connected to the discharge unit 11 and has the lowest current open-circuit voltage 8V may be connected to the charge unit 12.

In step S508, the voltage monitoring module 22 determines if there is any battery 10 in the battery unit 1 that has a current open-circuit voltage lower than the nominal voltage of the battery 10. If there is a battery 10 that has a current open-circuit voltage lower than the nominal voltage of the battery 10, the energy conversion system 3 continuously charges the charge unit 12, and the procedure returns to step S504. Otherwise, if the current open-circuit voltage of each battery 10 in the battery unit 1 equals the nominal voltage of the battery 10, step S510 is implemented.

In step S510, the alarm module 24 sends a signal to alert the users that the charge unit 12 has completed charging. The signal may be an audio signal output by the output device, such as the speaker and/or a message displayed on the display device (not shown) of the apparatus 2.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a microprocessor of an apparatus for controlling charging and discharging of batteries in a battery unit that supplies power to power-driven equipment, the apparatus electrically connected to the battery unit, the power-driven equipment, and an energy conversion system, the method comprising:
    (a) setting number requirements of batteries to be connected to a discharge unit and a charge unit of the battery unit, and setting a cut-off discharge voltage and a nominal voltage of each battery, wherein each battery connects to a sensor;
    (b) when the power-driven equipment is started, detecting an open-circuit voltage of each battery by the respective sensor connected to the battery;

(c) establishing connections of the batteries with the discharge unit and the charge unit according to the open-circuit voltages of the batteries and the number requirements;

(d) monitoring variations of the open-circuit voltages of the batteries during the discharge unit supplying power to the power-driven equipment and the energy conversion system charging the charge unit;

(e) switching connections of one or more first batteries from the discharge unit to the charge unit, wherein a current open-circuit voltage of each first battery is lower than the cut-off discharge voltage of the first battery; and (f) switching connections of one or more second batteries from the charge unit to the discharge unit, wherein a current open-circuit voltage of each second battery equals the nominal voltage of the second battery.

2. The method of claim 1, wherein the energy conversion system comprises solar power generation apparatuses, wind power generation apparatuses, and electronic chargers.

3. The method of claim 1, wherein a cut-off discharge voltage of a battery is a voltage at which the battery is considered fully discharged, a nominal voltage of the battery is a typical voltage when the battery works with a usual temperature, and an open-circuit voltage of the battery is a difference of electrical potential between a positive terminal and negative terminal of the battery.

4. The method of claim 1, wherein step (e) comprises:

(e1) selecting one first battery;

(e2) checking if the charge unit has been connected with a preset number of third batteries, wherein a current open-circuit voltage of each third battery in the preset number is equal to or more than a cut-off discharge voltage of the third battery;

(e3) sending a signal to alert users of the power-driven equipment that the battery unit has low battery charges if the charge unit has not been connected with the preset number of third batteries; and (e4) switching the connection of the first battery from the discharge unit to the charge unit, and switching a connection of a battery, which is connected to the charge unit and has a highest current open-circuit voltage compared to other batteries connected to the charge unit, from the charge unit to the discharge unit.

5. The method of claim 4, wherein step (e) further comprises:

(e5) determining if there is any battery in the battery unit that has a current open-circuit voltage higher than the cut-off discharge voltage of the battery;

(e6) continuously providing power to the power-driven equipment by the discharge unit, and returning to step (e1), when there is a battery in the battery unit that has a current open-circuit voltage higher than the cut-off discharge voltage of the battery; and (e7) informing the discharge unit to stop supplying power to the power-driven equipment, when the current open-circuit voltage of each battery in the battery unit is equal to or less than the cut-off discharge voltage of the battery.

6. The method of claim 1, wherein step (f) comprises:

(f1) selecting one second battery; and (f2) switching the connection of the second battery from the charge unit to the discharge unit, and switching a connection of a battery, which is connected to the discharge unit and has a lowest current open-circuit voltage compared to other batteries connected to the discharge unit, from the discharge unit to the charge unit.

7. The method of claim 6, wherein step (f) further comprises:

(f3) determining if there is any battery in the battery unit that has a current open-circuit voltage lower than the nominal voltage of the battery;

(f4) continuously charging the charge unit by the energy conversion system, and returning to step (f1), when there is a battery that has a current open-circuit voltage lower than the nominal voltage of the battery; and (f5) sending a signal to alert the users that the charge unit has completed charging, when the current open-circuit voltage of each battery in the battery unit equals the nominal voltage of the battery.

8. An apparatus electrically connected to a battery unit that consists of multiple batteries and supplies power to power-driven equipment, the apparatus further connected to an energy conversion system and the power-driven equipment, the apparatus comprising:

a storage device;

at least one microprocessor; and one or more programs executable by the at least one processor, the one or more programs comprising instructions to:

(a) set number requirements of batteries to be connected to a discharge unit and a charge unit of the battery unit, and set a cut-off discharge voltage and a nominal voltage of each battery, wherein each battery connects to a sensor;

(b) when the power-driven equipment is started, detect an open-circuit voltage of each battery by the respective sensor connected to the battery;

(c) establish connections of the batteries with the discharge unit and the charge unit according to the open-circuit voltages of the batteries and the number requirements;

(d) monitor variations of the open-circuit voltages of the batteries during the discharge unit supplying power to the power-driven equipment and the energy conversion system charging the charge unit;

(e) switch connections of one or more first batteries from the discharge unit to the charge unit, wherein a current open-circuit voltage of each first battery is lower than the cut-off discharge voltage of the first battery; and (f) switch connections of one or more second batteries from the charge unit to the discharge unit, wherein a current open-circuit voltage of each second battery equals the nominal voltage of the second battery.

9. The apparatus of claim 8, wherein a cut-off discharge voltage of a battery is a voltage at which the battery is considered fully discharged, a nominal voltage of the battery is a typical voltage when the battery works with a usual temperature, and an open-circuit voltage of the battery is a difference of electrical potential between a positive terminal and a negative terminal of the battery.

10. The apparatus of claim 8, wherein step (e) comprises:

(e1) select one first battery;

(e2) check if the charge unit has been connected with a preset number of third batteries, wherein a current open-circuit voltage of each third battery in the preset number is equal to or more than a cut-off discharge voltage of the third battery;

(e3) send a signal to alert users of the power-driven equipment that the battery unit has low battery charges when the charge unit has not been connected with the preset number of third batteries; and (e4) switch the connection of the first battery from the discharge unit to the charge unit, and switch a connection of a battery, which is connected to the charge unit and has a highest current open-circuit voltage compared to other batteries connected to the charge unit, from the charge unit to the discharge unit.

11. The apparatus of claim 10, wherein step (e) further comprises:
(e5) determine if there is any battery in the battery unit that has a current open-circuit voltage higher than the cut-off discharge voltage of the battery;
(e6) continuously provide power to the power-driven equipment by the discharge unit, and return to step (e1), when there is a battery in the battery unit that has a current open-circuit voltage higher than the cut-off discharge voltage of the battery; and
(e7) inform the discharge unit to stop supplying power to the power-driven equipment, when the current open-circuit voltage of each battery in the battery unit is equal to or less than the cut-off discharge voltage of the battery.

12. The apparatus of claim 8, wherein step (f) comprises:
(f1) select one second battery; and
(f2) switch the connection of the second battery from the charge unit to the discharge unit, and switch a connection of a battery, which is connected to the discharge unit and has a lowest current open-circuit voltage compared to other batteries connected to the discharge unit, from the discharge unit to the charge unit.

13. The apparatus of claim 12, wherein step (f) further comprises:
(f3) determine if there is any battery in the battery unit that has a current open-circuit voltage lower than the nominal voltage of the battery;
(f4) continuously charge the charge unit by the energy conversion system, and return to step (f1), when there is a battery that has a current open-circuit voltage lower than the nominal voltage of the battery; and
(f5) send a signal to alert the users that the charge unit has completed charging, when the current open-circuit voltage of each battery in the battery unit equals the nominal voltage of the battery.

14. The apparatus of claim 13, wherein the signal is an audio signal output by a speaker of the apparatus or a message displayed on a display device of the apparatus.

15. A non-transitory computer-readable medium storing a set of instructions, the set of instructions capable of being executed by a microprocessor of an apparatus for controlling charge and discharge of batteries in a battery unit that supplies power to power-driven equipment, the apparatus electrically connected with the battery unit, the power-driven equipment, and an energy conversion system, the method comprising:
(a) setting number requirements of batteries to be connected to a discharge unit and a charge unit of the battery unit, and setting a cut-off discharge voltage and a nominal voltage of each battery, wherein each battery connects to a sensor;
(b) when the power-driven equipment is started, detecting an open-circuit voltage of each battery by the respective sensor connected to the battery;
(c) establishing connections of the batteries with the discharge unit and the charge unit according to the open-circuit voltages of the batteries and the number requirements;
(d) monitoring variations of the open-circuit voltages of the batteries during the discharge unit supplying power to the power-driven equipment and the energy conversion system charging the charge unit;
(e) switching connections of one or more first batteries from the discharge unit to the charge unit, wherein a current open-circuit voltage of each first battery is lower than the cut-off discharge voltage of the first battery; and
(f) switching connections of one or more second batteries from the charge unit to the discharge unit, wherein a current open-circuit voltage of each second battery equals the nominal voltage of the second battery.

16. The medium of claim 15, wherein a cut-off discharge voltage of a battery is a voltage at which the battery is considered fully discharged, a nominal voltage of the battery is a typical voltage when the battery works with a usual temperature, and an open-circuit voltage of the battery is a difference of electrical potential between a positive terminal and a negative terminal of the battery.

17. The medium of claim 15, wherein step (e) comprises:
(e1) selecting one first battery;
(e2) checking if the charge unit has been connected with a preset number of third batteries, wherein a current open-circuit voltage of each third battery in the preset number is equal to or more than a cut-off discharge voltage of the third battery;
(e3) sending a signal to alert users of the power-driven equipment that the battery unit has low battery charges if the charge unit has not been connected with the preset number of third batteries; and
(e4) switching the connection of the first battery from the discharge unit to the charge unit, and switching a connection of a battery, which is connected to the charge unit and has a highest current open-circuit voltage compared to other batteries connected to the charge unit, from the charge unit to the discharge unit.

18. The medium of claim 17, wherein step (e) further comprises:
(e5) determining if there is any battery in the battery unit that has a current open-circuit voltage higher than the cut-off discharge voltage of the battery;
(e6) continuously providing power to the power-driven equipment by the discharge unit, and returning to step (e1), when there is a battery in the battery unit that has a current open-circuit voltage higher than the cut-off discharge voltage of the battery; and
(e7) informing the discharge unit to stop supplying power to the power-driven equipment, when the current open-circuit voltage of each battery in the battery unit is equal to or less than the cut-off discharge voltage of the battery.

19. The medium of claim 15, wherein step (f) comprises:
(f1) selecting one second battery; and
(f2) switching the connection of the second battery from the charge unit to the discharge unit, and switching a connection of a battery, which is connected to the discharge unit and has a lowest current open-circuit voltage compared to other batteries connected to the discharge unit, from the discharge unit to the charge unit.

20. The medium of claim 19, wherein step (f) further comprises:
(f3) determining if there is any battery in the battery unit that has a current open-circuit voltage lower than the nominal voltage of the battery;
(f4) continuously charging the charge unit by the energy conversion system, and returning to step (f1), when there is a battery that has a current open-circuit voltage lower than the nominal voltage of the battery; and
(f5) sending a signal to alert the users that the charge unit has completed charging, when the current open-circuit voltage of each battery in the battery unit equals the nominal voltage of the battery.

\* \* \* \* \*